Dec. 3, 1963   J. H. LANAHAN   3,112,643
TEST APPARATUS HAVING A REGENERATIVE SYSTEM
FOR LOADING ROTATING DEVICES
Filed May 2, 1960

INVENTOR
JOHN H. LANAHAN

BY
Robert W. Ely
ATTORNEY

United States Patent Office 3,112,643
Patented Dec. 3, 1963

3,112,643
TEST APPARATUS HAVING A REGENERATIVE
SYSTEM FOR LOADING ROTATING DEVICES
John H. Lanahan, Whitesboro, N.Y., assignor to The
Bendix Corporation, a corporation of Delaware
Filed May 2, 1960, Ser. No. 26,016
3 Claims. (Cl. 73—162)

This invention relates to apparatus for testing mechanical power transmission capabilities and more particularly concerns test apparatus which can subject rotating power transmitting devices such as flexible drive shafts and gear trains to loading.

An object of the present invention is to provide an improved test apparatus having a regenerative system for loading rotating devices to determine power transmission capabilities. A further object is the provision of such test apparatus wherein torsional deflection is effected in a closed-loop rotating system whereby high power application is possible with a prime mover of relatively low horsepower. An additional object is to provide such test apparatus wherein the torsional deflection in the closed-loop system can be effected while the device being tested is rotated. A further object is the provision of such test apparatus having torque applying means which slowly or rapidly loads through a single connection while the test apparatus is rotating.

The realization of the above objects along with the features and advantages of the present invention will be apparent from the following description and the accompanying drawing in which.

Figure 1:
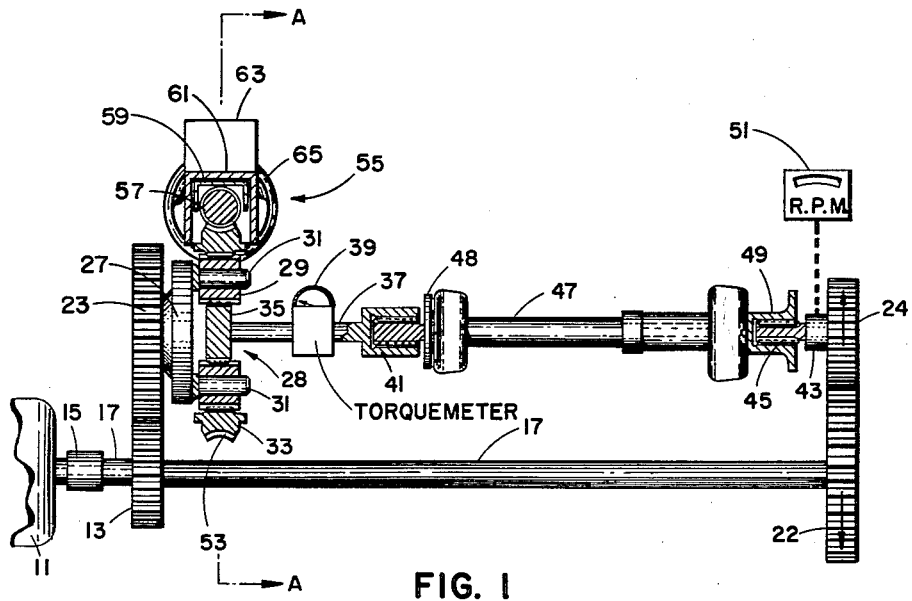
FIG. 1 is a longitudinal schematic view, with parts cross-sectioned, of test apparatus embodying the present invention and shows a torsionally-deflectible closed-loop system which includes a device to be tested and planetary gearing having a connection for the application of torque whereby the torque can be applied while device is rotating.

Referring to FIG. 1, a prime mover 11 such as a conventional variable speed drive is connected to a first gear 13 by means of coupling 15 and shaft 17. The torsinoally-deflectible torque shaft 17 carries first gear 13 at the left end or the transfer end and a second gear 22 at the other end or return end. A third gear 23 meshes with the first gear 13 while, at the right, a fourth gear 24 meshes with the second gear 22. The planet gear cage 27 of planetary gearing 28 is connected to the third gear 23. Four planet gears 29 carried by cage shafts 31 revolve in normally-stationary ring gear 33. Sun gear 35 meshes with the planet gears 29 and has a torsion shaft 37 extending to the right. Planetary gearing 28 provides a four-to-one speed reduction from torsion shaft 37 to third gear 23. The gear ratio at the transfer end (gears 13, 23 and planetary 28 which form a transfer gear case) is identical to the gear ratio of the return end gears 22 and 24 which form a return gear case. A conventional torquemeter 39 is mounted around torsion shaft 37 to provide a pound-inch torque reading derived from the torsional deflection or twist of torsion shaft 37. The type TG torquemeter currently sold by the Crescent Engineering and Research Co. of El Monte, California has proved suitable.

Torsional shaft 37 has an internally-splined connector 41 and the gear shaft 43 extending to the left from fourth gear 24 has an externally-splined connector 45 whereby mounting means are provided for mounting the device to be tested. Such means can be flanges or other conventional mounting structure. The closed-loop gear means having mounting means for the device to be tested thus provided can maintain a predetermined speed relation and opposite rotation between the torque shaft 17 and the parallel structure when a device for testing is mounted to form a closed-loop system. A telescoping flexible drive shaft 47 (such as disclosed in U.S. Patent No. 2,883,839) is shown mounted in connectors 41 and 45 and by means of externally-splined flanged adapter 48 at the left end of flexible shaft 47 to provide a few degrees of axial misalignment and the internally-splined cup-like structure 49 at the right end of flexible shaft 47. Conventional means for supporting the rotating gear shafts have been omitted. A speed indicator or tachometer 51 is connected to the fourth gear shaft 43 as indicated by the dashed line to provide means for measuring the rotational speed or r.p.m. of the device being tested.

Referring to the left end of the closed-loop or regenerative gear system, it can be seen that the normally stationary ring gear 33 has external teeth 53 which connect with torque or force applying means 55. The torque applying means 55 includes a worm 57 which meshes with the worm teeth 53 on the external surface of ring gear 33. Worm 57 is rotatably-mounted in end walls of sleeve or casing 59 which is slidably-mounted in housing 61 and is connected through reduction gearing 63 to a wheel 65 by structure which is shown in FIG. 2.

Figure 2:
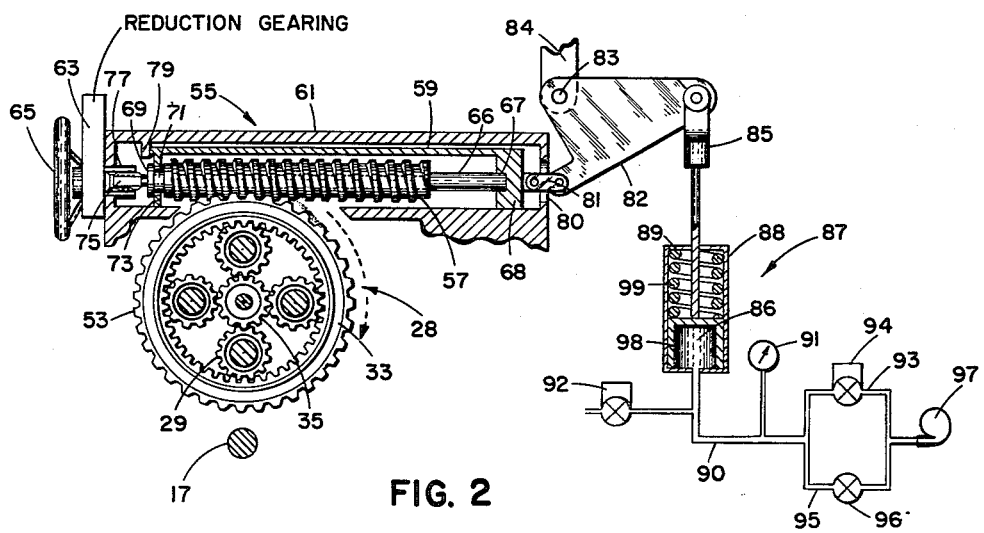
FIG. 2 is a transverse schematic view along the line A—A of FIG. 1 and shows the torque applying means connected to the ring gear of the planetary gearing and constructed so that slow manual and rapid or slow pneumatic loading can be done through a single connection while the device being tested is being rotated.

In FIG. 2, it can be seen that the right or support end 66 of the worm 57 is rotatably-supported in a recess 67 in right end wall 68 of casing 59 and that the left end or connection end 69 of the worm 57 has an annular recessed surface 71 which is rotatably-mounted in the depending left end wall 73 of casing 59. The connection end 69 of worm 57 also has an external connection spline 75 which is connected to the internally-splined hub 77 of the reduction gearing 63 which is attached to fixed housing 61. Wheel 65 and reduction gearing 63 constitute turning means for turning slowly the worm 57 whereby torque can be gradually applied to the ring gear 33. Since worm 57 is axially-splined to the hub 77 and the casing 59 is slidably mounted in the fixed housing 61, the casing (carrying worm 57) can be moved relative to the housing as limited due to the engagement between the worm 57 and the ring gear 33. The left end of the casing 59 abuts the left stop shoulder 79 of housing 61 which thus limits movement of the casing 59 upon rotating of the worm 57. Housing 61 also has a right-end wall 80 which can serve as a stop. It is apparent that, by turning wheel 65 counterclockwise as viewed from the left, worm 57 will impart a slight clockwise motion and torque to ring gear 33 as indicated by the dashed arrow. This action during rotation of the closed-loop will cause a momentary change in speed which results in a torsional deflection of the several shafts.

The force applying means also has a pneumatic arrangement for moving the worm 57 axially without rotation. The right end of casing 59 is connected by linkage 81 to the left end of lever 82 which pivots on pin 83 carried by fixed support member 84. The right end of the lever 82 is connected by a pin to piston arm 85. It is apparent that, if lever 82 is moved counterclockwise, casing 59 and worm 57 will be moved to the right, acting with ring gear 33 as a rack and pinion and imparting a torsional deflection in the shafts as above mentioned. Arm 85 connects to piston 86 of the pneumatic actuator 87. Actuator cylinder 88 has a top atmospheric vent 89 and two alternate air supplies connected into its inlet pipe 90 which as an indicator 91 responsive to air pressure and a quick-opening solenoid vent valve 92. The upper air supply pipe 93 has a quick-opening solenoid inlet valve 94 whereby the device being tested can be rapidly loaded. The lower air supply pipe 95 has a gradually-opening manual regulator 96 whereby slow loading can be accomplished. Both pipes 93 and 95 are supplied by being connected to an air source or compressor 97 providing air at a predetermined pressure. By suitable calibration, indicator 91 indicates the force or torque applied since it will be a function of pressure and lever length. Piston 86 has a depending sleeve 98 which abuts the bottom of cylinder 88 as urged by spring 99 confined above the piston 86 for normal positioning when the vent valve 92 is opened. It is apparent that a double-acting actuator with suitable valving can be used so that the worm can be moved to the left if desired.

In operation, a flexible drive shaft 47 or other rotating device which is to be tested for power transmission capability is mounted between the two connectors 41 and 45. The variable speed drive 11 is then energized overcoming the friction or braking force in the closed-loop gear system and providing the rotation indicated at the various gears. Assuming that the first gear 13 rotates at two thousand r.p.m., it is apparent that the second gear 22, fourth gear 24, and third gear 23 respectively rotate at two thousand, four thousand and one thousand r.p.m. The planetary gearing 28 provides the four-to-one speed reduction and the ring gear 33 remains stationary. Flexible drive shaft 47 will be rotating at four thousand r.p.m. and this speed is shown on speed indicator 51 which connects to the shaft 43 of fourth gear 24. In order to gradually load the device under test, the wheel 65 is turned with the result that worm 57 slowly turns and very slightly rotates ring gear 33 clockwise as seen in FIG. 2. This application of force causes momentary changes in ratio and in speed of the torque shaft gear 13 and third gear 23 at the left. Since both ends of the torque shaft 17 are geared to the structure between the third and fourth gears 23 and 24, the momentary change in speed results in torsional deflection throughout. As long as the force is applied, this torsional deflection will exist. Since deflection of the shafts is directly related to the force applied, the torquemeter 39 provides a torque reading in inch-pounds. This torque reading and the speed can be readily translated to horsepower.

The above-described torsional deflection is also obtained by gradually opening regulator 96 so that worm casing 59 and worm 57 are moved to the right in housing 61 due to the movement of lever 82 as urged by pressurized air acting on piston 86. Normal positioning is effected by opening vent valve 92 and closing regulator 96 so that piston 86 is urged down by spring 99. For rapid loading, the quick-opening solenoid valve 94 is opened so that the air at a predetermined pressure quickly provides the force for the torsional deflection above described by rapidly moving piston 86 of the pneumatic actuator 87. If the value of this rapid loading is high to give overloading, the quick-opening vent valve 92 is operable to limit the overloading to a brief period of time.

From the foregoing, it is apparent that a test device has been provided which permits loading while the device to be tested is being rotated and that the arrangement permits slow manual loading or rapid pneumatic loading or both slow and rapid loading by pneumatic means. It is to be understood that the stationary element of the planetary gearing in other arrangements can be the sun gear or planet cage. It is noteworthy that the device being tested can be tested for relatively high horsepower transmission (75 H.P.) with a prime mover of relatively low horsepower (7.5 H.P.) due to the regenerative system of loading.

It is to be understood that persons skilled in the art can make changes in the disclosed embodiment without departing from the invention as set forth in the appended claims.

What is claimed is:

1. Test apparatus for subjecting a rotating power transmission device to a load test comprised of a prime mover, closed-loop gear means connected to said prime mover, said gear means including a torque shaft and a planetary gearing having a normally stationary member, said gear means further including mounting means for mounting a device to be tested, force applying means connected to the stationary member of said planetary gearing whereby when a device to be tested is mounted in said closed-loop gear means the resulting regenerative gear system can be loaded with torsional deflection, measuring means constructed and arranged to determine the torque applied to said closed-loop gear system, said force applying means being constructed so that a small force can be gradually-applied and further so that a large force can be rapidly applied, a speed indicator connected to said closed loop gear means and arranged to indicate the speed of the device to be tested, said stationary member of said planetary gearing having external worm teeth, said force applying means including a worm meshing with the external worm teeth of said stationary planetary member, a casing, said worm gear being rotatably-mounted in said casing, a housing, said casing being slidably mounted in said housing, said force applying means including a lever connected to said casing and a fluid-operated actuator connected to said lever.

2. Test apparatus for subjecting a rotating power transmission device to a load test comprised of a prime mover, closed-loop gear means connected to said prime mover, said gear means including a torque shaft and a planetary gearing having a normally stationary member, said gear means further including mounting means for mounting a device to be tested, force applying means connected to the stationary member of said planetary gearing whereby when a device to be tested is mounted in said closed-loop gear means the resulting regenerative gear system can be loaded with torsional deflection, measuring means constructed and arranged to determine the torque applied to said closed-loop gear system, said stationary planetary member having worm teeth on the exterior surface thereof, said force applying means includnig a worm meshing with said worm teeth and having a connection end and a support end, a movable casing rotatably-mounting said worm at said connection end and said support end thereof, a fixed housing, said casing being slidably mounted in said housing, said housing having stop means arranged to limit movement of said casing, said connection end of said worm having a connection spline, worm turning means having a splined hub connected to said connection spline of said worm, said worm turning means being constructed to turn slowly said splined hub whereby said worm is slowly rotated and torque is gradually applied, said force applying means including pneumatic means connected to said casing, said pneumatic means being arranged to move said casing and worm whereby torque can be applied to the closed-loop gear system when formed.

3. Test apparatus comprised of a torque shaft having a transfer end and a return end, said transfer end being connected to said prime mover, a first gear mounted on the transfer end of said torque shaft, a second gear mounted on the return end of said torque shaft, a third gear meshing with said first gear, a fourth gear meshing with said second gear, a planet gear cage connected to said third gear, planet gears carried by said cage, a ring gear and sun gear meshing with said planet gears to form planetary gearing, said sun gear having a torsion shaft extending toward said fourth gear, said torsion shaft having a connector for mounting one end of a device to be tested, a connector shaft extending from said fourth gear toward said torsion shaft connector and having a connector for mounting the other end of a device to be tested whereby a closed-loop gear system is formed when a device is mounted for testing, a prime mover connected to said torque shaft, said ring gear having worm teeth on the exterior surface thereof, a worm meshing with said ring gear worm teeth and having a connection end and a support end, a movable casing rotatably-mounting said worm at said connection end and said support end thereof, a fixed housing, said casing being slidably mounted in said housing, said housing having stop means arranged to limit movement of said casing, said connection end of said worm having a connection spline, worm turning means having a splined hub connected to said connection spline of said worm, said worm turning means being constructed to turn slowly said splined hub whereby said worm is slowly rotated and torque is gradually applied to said ring gear, a torquemeter connected to said torsion shaft, pneumatic means having a lever connected to said casing, said pneumatic means being arranged to move said casing and worm whereby torque can be applied to said ring gear and hence the closed loop gear system when formed, said pneumatic means having an actuator and including a quick-opening inlet valve and a quick-opening vent valve connected to the actuator so that torque can be rapidly applied and released whereby the device to be tested can be subjected to brief overloading.

References Cited in the file of this patent
UNITED STATES PATENTS

| | | |
|---|---|---|
| 2,371,607 | Collins | Mar. 20, 1945 |
| 2,712,756 | Greer et al. | July 12, 1955 |
| 2,935,869 | Shipley | May 10, 1960 |

FOREIGN PATENTS

| | | |
|---|---|---|
| 697,586 | Germany | Oct. 17, 1940 |
| 993,065 | France | July 18, 1951 |